United States Patent
Yagi

(10) Patent No.: US 9,423,611 B2
(45) Date of Patent: Aug. 23, 2016

(54) LENS AND METHOD OF FORMING SHAPE OF LENS BASED ON CALCULATED NORMAL DIRECTION OF LIGHT INCIDENT POINTS ON VIRTUAL LIGHT INCIDENT SURFACE

(75) Inventor: Takayuki Yagi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1054 days.

(21) Appl. No.: 13/219,994

(22) Filed: Aug. 29, 2011

(65) Prior Publication Data
US 2012/0065760 A1     Mar. 15, 2012

(30) Foreign Application Priority Data
Sep. 13, 2010 (JP) ................................ 2010-203955

(51) Int. Cl.
*G02B 3/00*     (2006.01)
*G06F 19/00*     (2011.01)
(Continued)

(52) U.S. Cl.
CPC ......... *G02B 27/0012* (2013.01); *F21S 48/1159* (2013.01); *F21S 48/1275* (2013.01);
(Continued)

(58) Field of Classification Search
CPC ...... G01B 11/002; G01B 11/24; G01B 21/20; H01L 22/12; G01N 21/01; G02B 19/0033; G02B 27/0012; B64D 47/04; F21K 9/90; F21S 48/1159; F21S 48/1275; F21S 48/137; G06F 2217/12; G06F 2217/16
USPC ........... 359/642; 264/1.1, 1.32; 356/516, 520, 356/601, 612; 362/516, 522; 348/46; 702/167; 351/246; 700/97, 98
See application file for complete search history.

(56) References Cited

U.S. PATENT DOCUMENTS 5,258,897 A * 11/1993 Nino ................... F21S 48/1358
362/346
5,940,308 A * 8/1999 Ishikawa et al. .................. 703/8
(Continued)

FOREIGN PATENT DOCUMENTS

CN     101251650 A     8/2008
CN     101825256 A     9/2010
(Continued)

OTHER PUBLICATIONS

E. E. Kummer. General theory of rectilinear ray systems. Translated by D. H. Delphenich. Allgemeine Theorie der gradlinigen Strahlensysteme, J. f. reine u. angew. Math. 57 (1860), 189-230.*
(Continued)

*Primary Examiner* — Bumsuk Won
*Assistant Examiner* — Collin X Beatty
(74) *Attorney, Agent, or Firm* — Sughrue Mion, PLLC

(57) ABSTRACT

A light incident surface of a lens is determined to have a shape of a virtual light incident surface (SF1). The virtual light incident surface (SF1) is defined based on normal directions (ni) respectively calculated at a plurality of light incident points (Pi) of the virtual light incident surface (SF1) such that lights emitted from a first light emitting point (S1) and incident on the respective light incident points (Pi) are projected onto a first projection point (r1) and that lights emitted from a second light emitting point (S2) and incident on the respective light incident points (Pi) are projected onto a second projection point (r2) spaced in a predetermined direction from the first projection point (r1).

5 Claims, 11 Drawing Sheets

(51) Int. Cl.
   *G02B 27/00* (2006.01)
   *G02B 19/00* (2006.01)
   *F21S 8/10* (2006.01)

(52) U.S. Cl.
   CPC ........... *F21S48/137* (2013.01); *G02B 19/0028* (2013.01); *G02B 19/0061* (2013.01); *G06F 2217/12* (2013.01); *G06F 2217/16* (2013.01)

(56) References Cited

U.S. PATENT DOCUMENTS

| | | | | |
|---|---|---|---|---|
| 6,273,596 | B1 * | 8/2001 | Parkyn, Jr. | F21V 5/048 362/292 |
| 6,505,961 | B2 * | 1/2003 | Natsume | 362/460 |
| 6,578,996 | B1 * | 6/2003 | Kawashima | F21S 48/23 362/516 |
| 6,960,007 | B2 * | 11/2005 | Ishida et al. | 362/538 |
| 7,246,049 | B2 * | 7/2007 | Nakanishi et al. | 703/8 |
| 7,460,985 | B2 * | 12/2008 | Benitez et al. | 703/2 |
| 8,630,825 | B1 * | 1/2014 | Sybesma | G02B 5/10 359/240 |
| 2002/0183994 | A1 * | 12/2002 | Fuse | G02B 5/1847 703/6 |
| 2004/0202007 | A1 * | 10/2004 | Yagi | F21S 48/1159 362/545 |
| 2005/0086032 | A1 * | 4/2005 | Benitez | G02B 27/0012 703/1 |
| 2005/0141233 | A1 * | 6/2005 | Matsumoto | F21S 48/1358 362/517 |
| 2005/0237758 | A1 * | 10/2005 | Takeda | B60Q 1/04 362/512 |
| 2005/0254254 | A1 * | 11/2005 | Moseler et al. | 362/520 |
| 2007/0030674 | A1 * | 2/2007 | Kim et al. | 362/231 |
| 2007/0047250 | A1 * | 3/2007 | Kinoshita | F21S 48/1388 362/539 |
| 2007/0058386 | A1 * | 3/2007 | Albou | 362/520 |
| 2008/0043339 | A1 * | 2/2008 | Rubinstein | G02B 27/09 359/642 |
| 2008/0080201 | A1 * | 4/2008 | Specht | F21S 48/1154 362/507 |
| 2008/0080207 | A1 * | 4/2008 | Specht | F21S 48/1241 362/581 |
| 2008/0123076 | A1 * | 5/2008 | Sasian | G02B 27/0012 356/30 |
| 2008/0253142 | A1 * | 10/2008 | Nakada | B60Q 1/0041 362/507 |
| 2009/0262546 | A1 * | 10/2009 | Stefanov | F21S 48/1154 362/507 |
| 2010/0208467 | A1 * | 8/2010 | Dross | G02B 5/08 362/297 |
| 2010/0232173 | A1 * | 9/2010 | Ohno | F21S 2/005 362/538 |
| 2010/0309679 | A1 * | 12/2010 | Yamagata | F21S 48/1159 362/539 |
| 2012/0038889 | A1 * | 2/2012 | Drobe | G02C 7/027 351/246 |

FOREIGN PATENT DOCUMENTS

| | | |
|---|---|---|
| JP | 3-174109 A | 7/1991 |
| JP | 2007-80817 A | 3/2007 |

OTHER PUBLICATIONS

M. Pasch. On the focal surfaces of ray systems and the singularity surfaces of complexes. Translated by D. H. Delphenich. "Ueber die Brennflächen der Strahlensysteme und die Singularitätenflächen der Compleze," J. f. reine u. angew. Math. 76 (1873), 156-169.*
Alzarez et al., "TIR-R Concentrator: a new compact high-gain SMS design," Proceedings of the SPIE, The International Society for Optical Engineering, Aug. 2, 2001, pp. 32-42, vol. 4446, USA.
Communication dated Dec. 14, 2011, issued in corresponding European Patent Application No. 11180186.6.
Sun et al., "Free-form Micro-lens Design for Solid State Lighting", Acta Photonica Sinica, China Academic Journal Electronic Publishing House, May 31, 2010, vol. 39, No. 5, pp. 6-11.
Communication dated Sep. 17, 2013, issued by the State Intellectual Property Office of the People's Republic of China in corresponding Application No. 201110272031.9.
Office Action dated May 9, 2014, issued by the State Intellectual Property Office of the People's Republic of China in counterpart Chinese Application No. 201110272031.9.
Office Action dated May 7, 2014 issued by the Japanese Patent Office in counterpart Japanese Patent Application No. 2010-203955.

* cited by examiner

LENS AND METHOD OF FORMING SHAPE OF LENS BASED ON CALCULATED NORMAL DIRECTION OF LIGHT INCIDENT POINTS ON VIRTUAL LIGHT INCIDENT SURFACE

BACKGROUND OF THE INVENTION

1. Field of the Invention

The present invention relates to a lens and a method for manufacturing a lens. Specifically, it relates to a lens including a light incident surface having a shape determined by a certain design method and a method for manufacturing such lens.

2. Related Art

Recently, a development of a semiconductor light emitting element such as an LED (Light Emitting Diode) has advanced and a use of such element has been enlarged. Such semiconductor light emitting element generally includes a light emitting portion having a flat shape. Here, in order to obtain a lens capable of forming a desired light distribution pattern making effective use of the shape of the light emitting portion of such light source, US-2005-0086032-A discloses a method in which a large number of span points existing in common in respective light incident and outgoing surfaces are defined first to thereby determine respective shapes of the light incident and outgoing surfaces. Further, JP-H03-174109-A discloses a technology which firstly determines a shape of a light incident surface and thereafter determines a shape of a light outgoing surface.

According to the technology disclosed in US-2005-0086032-A, the shapes of the light incident surface and light emitting surface are simultaneously determined. However, it is difficult to determine the shape of the light outgoing surface while taking the space and design thereof into consideration. Thus, from a viewpoint of realizing a high degree of freedom of design when designing a lens, there is room for improvement.

SUMMARY OF THE INVENTION

One or more embodiments of the invention provide a lens which can make effective use of a shape of a light emitting portion of a light source in a light distribution pattern to be formed and also which has a high degree of freedom of design.

In accordance with one or more embodiments, a lens 14 is provided with a light incident surface 14c formed to have a shape of a virtual light incident surface SF1 defined based on normal directions ni respectively calculated at a plurality of light incident points Pi of the virtual light incident surface SF1 such that lights emitted from a first light emitting point S1 and incident on the respective light incident points Pi are projected onto a first projection point r1 and that lights emitted from a second light emitting point S2 and incident on the respective light incident points Pi are projected onto a second projection point r2 spaced in a predetermined direction from the first projection point r1.

Other aspects and advantages of the invention will be apparent from the following description and the appended claims.

DETAILED DESCRIPTION OF EXEMPLARY EMBODIMENT

An exemplary embodiment of the invention is described with reference to the accompanying drawings.

Figure 1:
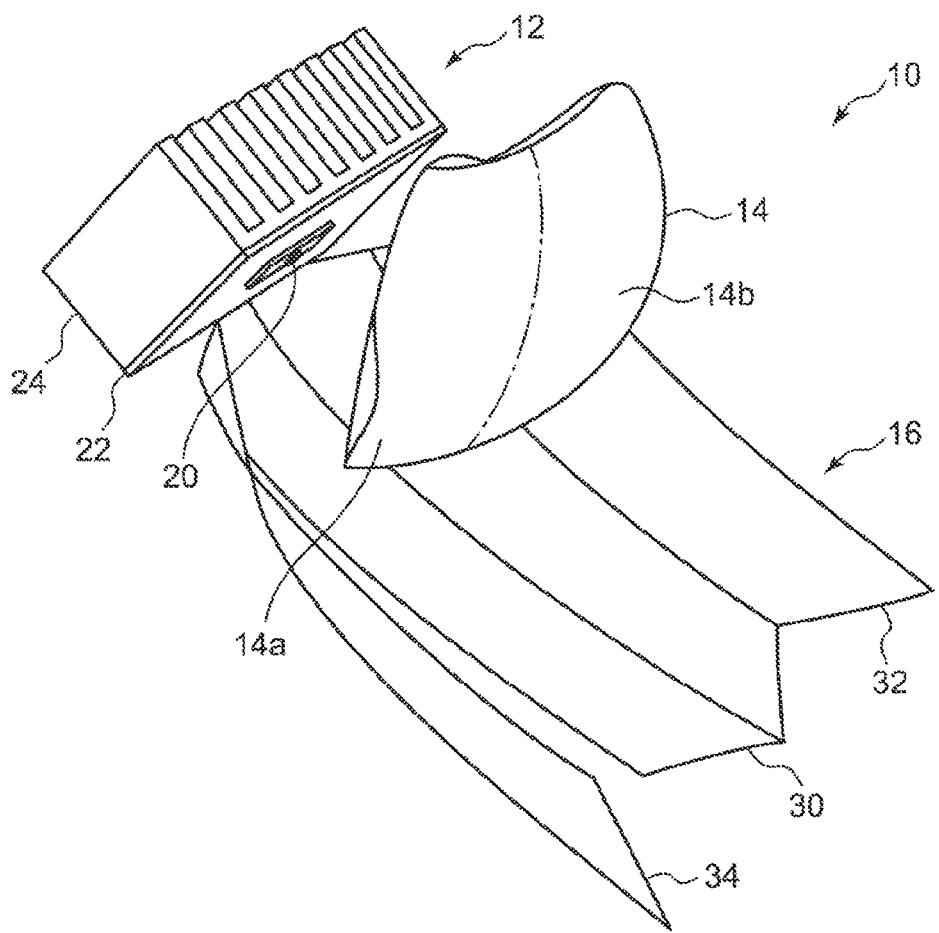
FIG. 1 is a perspective view of a structure of a vehicle lighting apparatus carrying thereon a projection lens of an exemplary embodiment.
Figure 2:
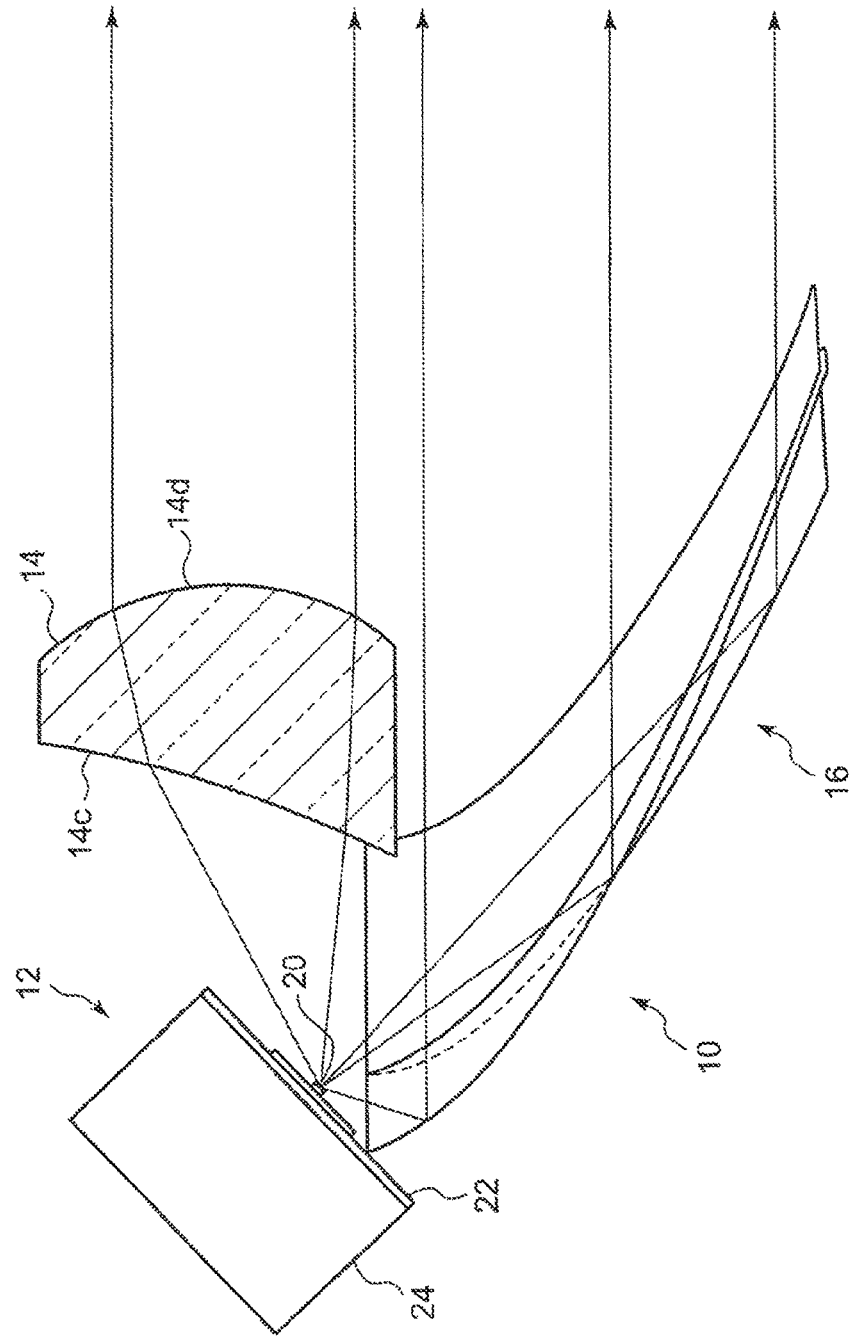
FIG. 2 is a vertical section view of the vehicle lighting apparatus.

FIG. 1 is a perspective view of a structure of a vehicle lighting apparatus 10 carrying thereon a projection lens 14 of the exemplary embodiment. The vehicle lighting apparatus 10 includes a light source unit 12, a projection lens 14 and a reflector unit 16. The projection lens 14 is structured such that its first and second lens portions 14a and 14b are formed integrally with each other. FIG. 2 is a vertical section view of the vehicle lighting apparatus 10, including the section of the first lens portion 14a.

The light source unit 12 includes a semiconductor light emitting element 20, a substrate 22 and a heat sink 24. The semiconductor light emitting element 20 is a light source including an LED (Light Emitting Diode) and has a rectangular-shaped light emitting surface. According to the exemplary embodiment, the length of the long side of the light emitting surface is set approximately four times the length of the short side thereof. Here, of course, the shape of the light emitting surface of the semiconductor light emitting element 20 is not limited to this shape. For example, the semiconductor light emitting element 20 may also have a square-shaped light emitting surface, or may also be formed as a unit constituted of multiple individual light emitting elements which respectively have a square-shaped light emitting surface and are arranged in one line or in multiple lines.

The semiconductor light emitting element 20 is disposed such that the long side of the light emitting surface thereof extends horizontally and the light emitting surface faces obliquely downwardly from the front portion of the lighting apparatus. According to the exemplary embodiment, the light source unit 12 is disposed such that the main optical axis of the semiconductor light emitting element 20, that is, the vertical line of the light emitting surface is inclined downwardly at an angle of 45° from in the front portion of the lighting apparatus. Here, of course, the inclination angle of the light source unit 12 is not limited to the angle of 45°.

The semiconductor light emitting element 20 is mounted through an actually mounting substrate (not shown) on the surface of the substrate 22 which serves as a printed circuit board. On the back surface of the substrate 22, there is mounted the heat sink 24. The heat sink 24 collects heat generated by the semiconductor light emitting element 20 and radiates the thus collected heat to thereby cool the semiconductor light emitting element 20.

The reflector unit 16 is disposed downwardly of the semiconductor light emitting element 20. The reflector unit 16 includes a central reflector 30, a left reflector 32 and a right reflector 34. The central reflector 30 is disposed inclined such that it lowers down as it goes from just below the semiconductor light emitting element 20 toward the front portion of the lighting apparatus. The left reflector 32 is disposed on the left of the central reflector 30 and is inclined such that, similarly to the central reflector 32, it lowers down as it goes from just below the semiconductor light emitting element 20 toward the front portion of the lighting apparatus. The right reflector 34 is disposed on the right of the central reflector 30 and is inclined such that it lowers down similarly as it goes from just below the semiconductor light emitting element 20 toward the front portion of the lighting apparatus.

The projection lens 14 is disposed forwardly of the semiconductor light emitting element 20 in the lighting apparatus. In the following description, a light incident surface 14c and a light outgoing surface 14d respectively represent the light incident surface and light outgoing surface of the first lens portion 14a. The projection lens 14 is disposed such that the light incident surface 14c faces the light emitting surface of the semiconductor light emitting element 20. The light emitted from the semiconductor light emitting element 20 enters from the light incident surface 14c and is discharged from the light outgoing surface 14d, whereby it is radiated forwardly of the lighting apparatus.

Figure 3:
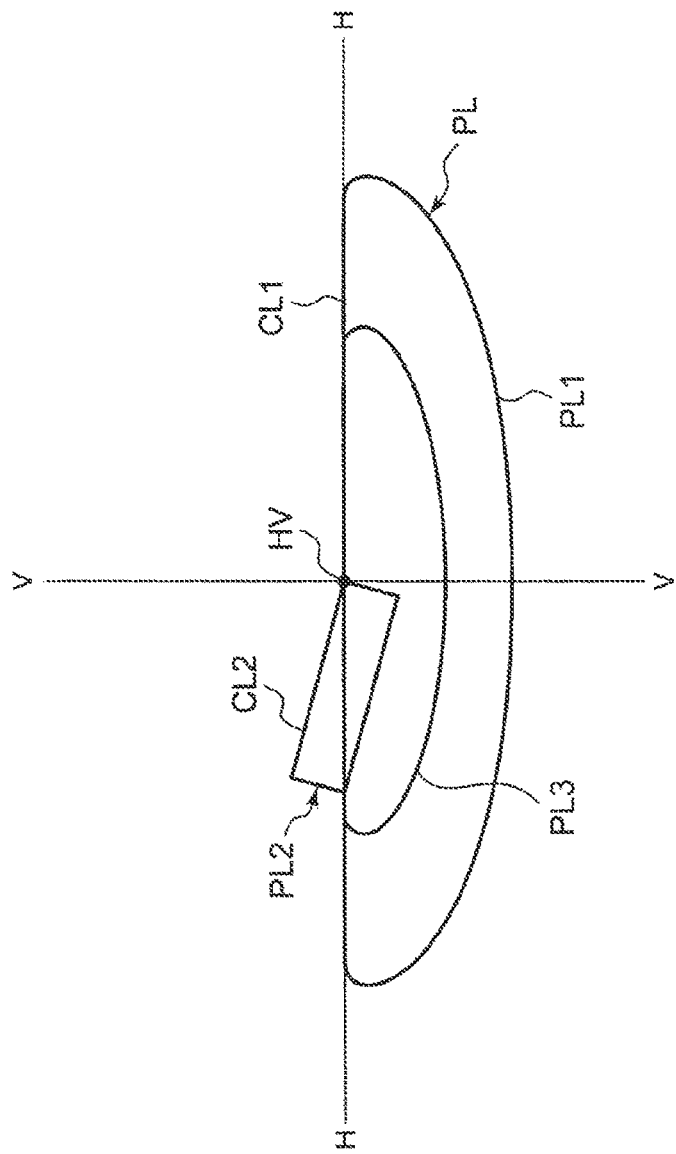
FIG. 3 is a low beam light distribution pattern PL which is formed by the vehicle lighting apparatus of the exemplary embodiment.

FIG. 3 is a view of a low beam light distribution pattern PL which is formed by the vehicle lighting apparatus 10 according to the exemplary embodiment. The low beam light distribution pattern PL has first and second cutoff lines CL1 and CL2. In the following description, a point of intersection between a horizontal line (which is hereinafter referred to as an "H-H line") and a vertical line (which is hereinafter referred to as a "V-V line") passing through the center of the forward portion of the lighting apparatus is designated by "HV".

The first cutoff line CL1 exists on the right of HV and extends on the H-H line. The second cutoff line CL2 exists on the right of HV and extends linearly such that it is inclined upwardly left from HV.

The low beam light distribution pattern PL is formed in such a manner that a wide zone light distribution pattern PL1, a first hot zone light distribution pattern (which is hereinafter referred to as an "HZ light distribution pattern") PL2, and a central light distribution pattern PL3 are superimposed on top of each other. The wide zone light distribution pattern PL1 is formed in such a manner that the light emitted by the semiconductor light emitting element 20 is reflected forwardly of the lighting apparatus by the reflector unit 16. The HZ light distribution pattern PL2 is formed in such a manner that the light emitted by the semiconductor light emitting element 20 is condensed by the first lens portion 14a of the projection lens 14 and is discharged forwardly of the lighting apparatus. The central light distribution pattern PL3 is formed in such a manner that the light emitted by the semiconductor light emitting element 20 is condensed by the second lens portion 14b of the projection lens 14 and is discharged forwardly of the lighting apparatus.

The wide zone light distribution pattern PL1 is formed such that it spreads horizontally below the H-H line. The central light distribution pattern PL3 exists below the H-H line and is formed such that it spreads horizontally in a narrow range nearer to the V-V line than the wide zone light distribution pattern PL1. The first cutoff line CL1 is formed by the upper ends of such portions of the wide zone light distribution pattern PL1 and central light distribution pattern PL3 as exist on the right of the V-V line. A reflector for forming such wide area light distribution pattern PL1 is known well and, therefore, there is omitted here the description of the structure of the reflector unit 16. Also, since a lens used to form such central light distribution pattern PL3 is also known well, there is also omitted here the description of the structure of the second lens portion 14b.

The HZ light distribution pattern PL2 is formed in a narrow and long rectangular shape. The HZ light distribution pattern PL2 is formed such that, while the upper right corner portion thereof is situated at HV, it is inclined parallel to the inclining direction of the second cutoff line CL2. Therefore, the second cutoff line CL2 is formed by the upper edge portion of the HZ light distribution pattern PL2.

Here, according to the exemplary embodiment, since the shape of the light emitting surface of the semiconductor light emitting element 20 is a long and narrow rectangular shape similarly to the HZ light distribution pattern PL2, the light emitting surface of the semiconductor light emitting element 20 is used as it is as a light source image and is projected forwardly of the vehicle to thereby form the HZ light distribution pattern PL2. In the exemplary embodiment, in order to determine the shape of the projection lens 14 capable of such projection, the shape of the light incident surface 14c is determined first. After then, using the determined shape of the light incident surface 14c, the shape of the light outgoing surface 14d is determined. Since the shape of the light incident surface 14c is determined before the shape of the light outgoing surface 14d is determined in this manner, it is possible to determine such light outgoing surface 14d as can correspond to design conditions including a space and a design.

In this manner, since the shape of the light incident surface 14c is determined first, according to the exemplary embodiment, firstly, on the light emitting surface, there are defined first and second light emitting points S1 and S2 and, further, on a virtual vertical screen (which is hereinafter referred to as a "screen") on which the low beam light emitting pattern PL is to be formed, there is defined a first projection point r1. A screen according to the exemplary embodiment is a screen which, 25 m forwardly of from the semiconductor light emitting element 20 in the front portion of the lighting apparatus, extends perpendicularly to the optical axis of the lighting apparatus and also in the vertical direction. However, of course, the screen is not limited to the above screen but, for example, a space existing upwardly of the road may also be defined as a screen.

Next, in order that the light emitted from the first light emitting point S1 can be incident onto multiple light incident points Pi respectively existing on a virtual incident surface SF1 and can be then projected to the first projection point r1, and also that the light emitted from the second light emitting point S2 can be incident onto the multiple light incident points Pi and can be then projected to a second projection point r2 existing in a predetermined direction from the first projection point r1, there are calculated the light incident point normal vectors ni of the virtual light incident surface SF1 at the respective light incident points Pi. Finally, using the light incident point normal vectors ni at the respective light incident points Pi, there is defined the shape of the virtual light incident surface SF1. An actual light incident surface 14c in the projection lens 14 is formed such that it has the thus defined shape of the virtual light incident surface SF1.

Now, description will be given below specifically of a method for designing the shape of such light incident surface 14c with reference to FIGS. 4 to 10.

Figure 4:
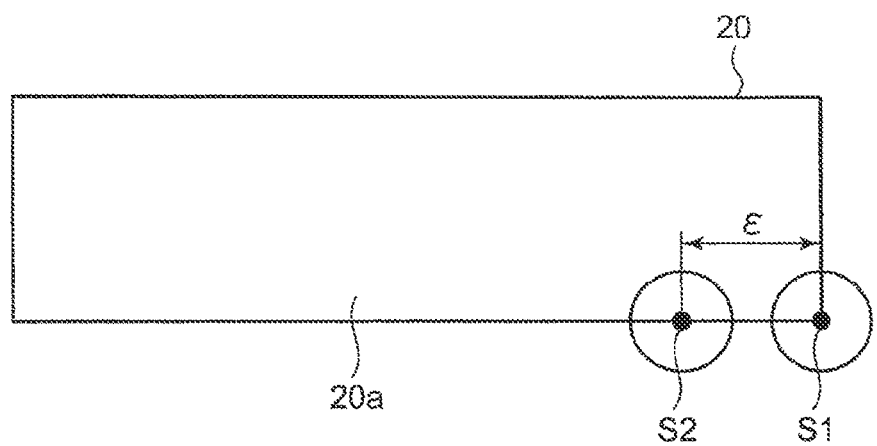
FIG. 4 is an explanatory view of a method for defining a first light emitting point S1 and a second light emitting point S2.

FIG. 4 is an explanatory view of a method for defining the first and second light emitting points S1 and S2. The first and second light emitting points S1 and S2 are respectively defined such that they exist on the same end edge of the light emitting surface 20a of the semiconductor light emitting element 20. Specifically, the lower right corner portion of the semiconductor light emitting element 20 is projected by the projection lens 14 to thereby provide the corner portion of HV of the HZ light distribution pattern PL2. Also, such lower edge portion of the light emitting surface 20a as extends horizontally from the lower right corner portion is projected by the projection lens 14 to thereby provide the second cutoff line CL2 of the HZ light distribution pattern PL2. Therefore, the position of the first light emitting point S1 is defined as such lower right corner portion of the light emitting surface 20a as corresponds to HV. Next, the position of the second light emitting point S2 is defined on such portion of the lower edge portion of the light emitting surface 20a as corresponds to the second cutoff line CL2.

In this case, the second light emitting point S2 is defined as a position spaced by a slight distance $\epsilon$ from the first light emitting point S1. This slight distance $\epsilon$ is equal to or less than half of the lower edge portion of the light emitting surface 20a, for example, it may also be a distance one-hundredth or so of the lower edge portion of the light emitting surface 20a.

In this manner, the first and second light emitting points S1 and S2 are respectively defined such that they exist on the same end edge portion. Here, of course, the defined positions of the first and second light emitting points S1 and S2 are not limited to the above positions but, for example, the first light emitting point S1 may also be defined such that it exits on the other edge portion than the corner portion. Also, the first and second light emitting points S1 and S2 may also be defined such that they exist on the other edge portion.

Figure 5:
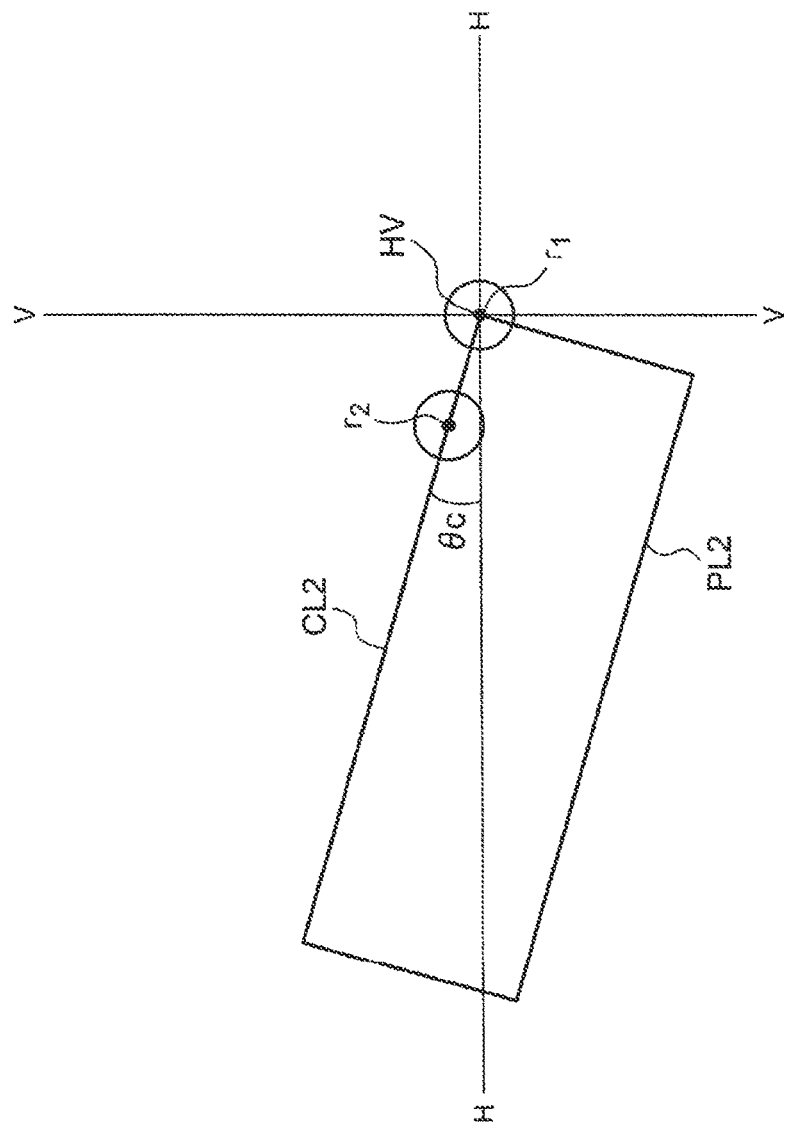
FIG. 5 is an explanatory view of a method for defining a first projection point r1 and a second projection point r2.

FIG. 5 is an explanatory view of a method for defining the first and second projection points r1 and r2. The first projection point r1 is defined such that it exists on the second cutoff line CL2 of the HZ light distribution pattern PL2 to be formed. According to the exemplary embodiment, since the first light emitting point S1 is defined such that it exists on the corner portion of the light emitting surface 20a, the first projection point r1 is defined such that it exists on the right end portion of the second cutoff line CL2, that is, on HV.

The second projection point r2 is defined such that it exists in the extending direction of the second cutoff line CL2 from the first projection point r1. Thus, the second projection point r2 is defined such that it exists on the second cutoff line CL2. The inclination angle $\theta c$ of the second cutoff line CL2 is set for an angle of 15° with respect to the H-H line. Here, of course, the inclination angle $\theta c$ of the second cutoff line CL2 is not limited to this angle.

At this time, there is decided only the fact that the second projection point r2 exists on the second cutoff line CL2 and in the vicinity of HV, but the specific position thereof is not defined at this time. The reason for this is as follows. That is, when the first light emitting point S1 is projected at the first projection point r1 and the second light emitting point S2 is projected on the second cutoff line CL2 and near HV, the HZ light distribution pattern PL2 can be substantially formed by the projection image of the light emitting surface 20a.

Figure 6:
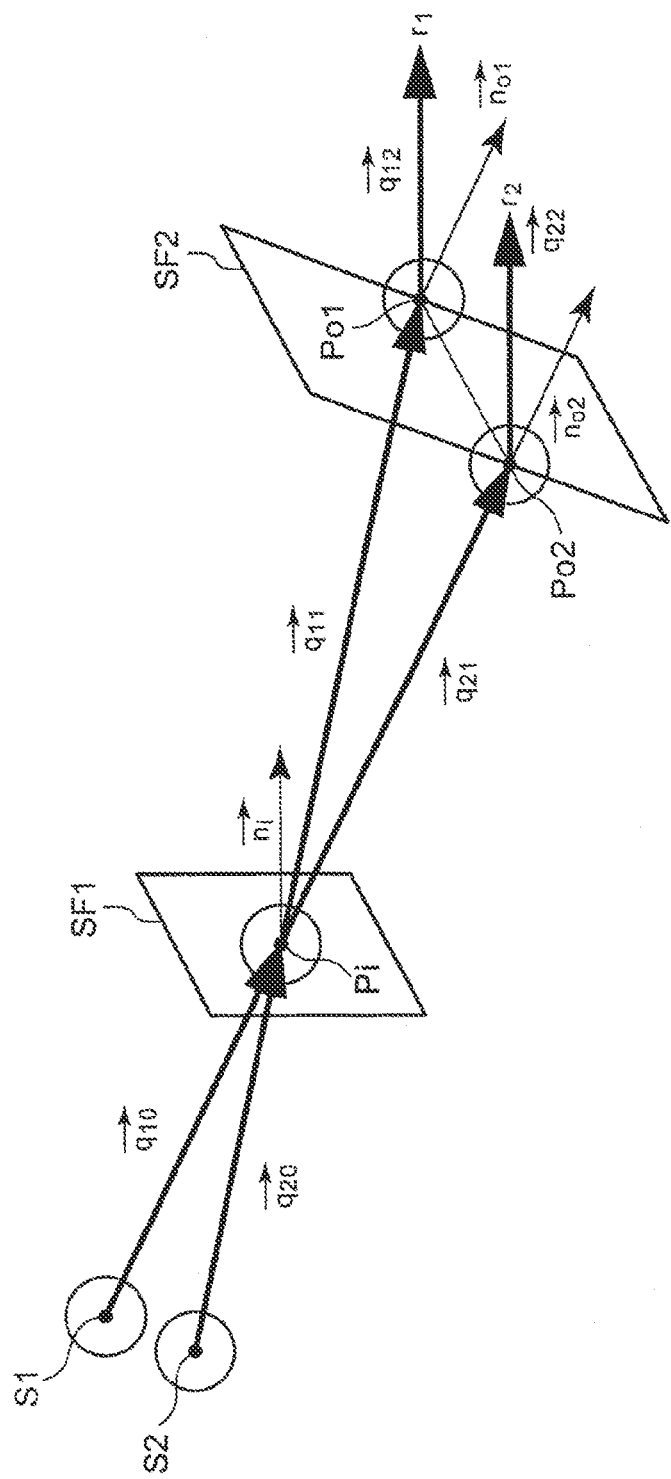
FIG. 6 is an explanatory view of a method for calculating a light incident point normal vector ni.

FIG. 6 is an explanatory view of a method for calculating light incident point normal vectors ni. Firstly, a light incident point Pi is defined at an arbitrary position. Specifically, this light incident point Pi is defined to exist on a virtual light incident surface SF1 where the light incident surface 14c is substantially assumed to exist.

Figure 7:
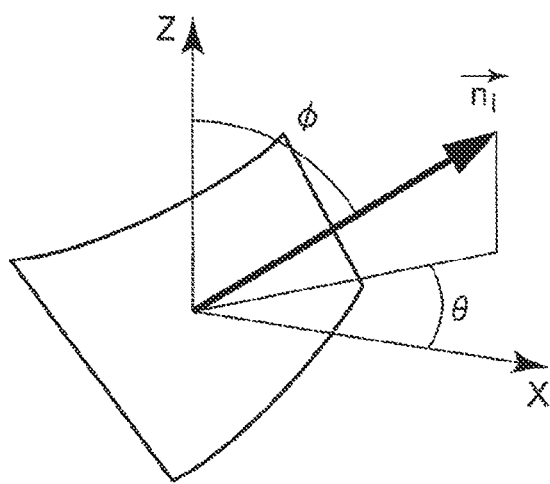
FIG. 7 is a view of the light incident point normal vector ni.

Here, as shown in FIG. 7, the direction of a light incident point normal vector ni, which is the unit normal vector of the virtual light incident surface SF1 at the light incident point Pi, is expressed by polar coordinates ($\phi$, $\theta$). In the following description, the term "vector" means a unit vector which is used to express only the direction. Using the refractive index of material for forming the projection lens 14, a first light incident vector q10 ($\phi,\theta$) going from the first light emitting point S1 toward the light incident point Pi and a light incident point normal vector ni ($\phi,\theta$), there can be expressed a first transmission vector q11 ($\phi,\theta$) which is the advancing direction of the light from the light incident point Pi.

Here, assuming that the leading end of the first transmission vector q11 exists on a virtual light outgoing surface SF2, the leading end of the first transmission vector q11 ($\phi,\theta$) provides a first light outgoing point Po1 at which the light goes out from the projection lens 14. Here, although the thickness of the projection lens 14 is greater than the length of the first transmission vector q11, since the HZ light distribution pattern PL2 is very large with respect to the size of the projection lens 14, even when the leading end of the first transmission vector q11 is assumed to exist on the virtual light outgoing surface SF2, the shape of the light incident surface 14c can be decided with no special problem. Also, the position of the virtual light outgoing surface SF2 is not limited to the leading end of the first transmission vector q11, but the virtual light outgoing surface SF2 may also be assumed to exist at a position more distant from the light incident point Pi than the leading end of the first transmission vector q11. In this case, with the thickness of the projection lens 14 to be expected taken into consideration, there may also be set the distance from the light incident point Pi to the virtual light outgoing surface SF2.

Since the light to be emitted from the first light outgoing point Po1 goes toward the first projection point r1, a unit vector going from the first light outgoing point Po1 toward the first projection point r1 provides a first light outgoing vector q12. Therefore, using the refractive index of material for forming the projection lens 14, a first transmission vector q11 ($\phi,\theta$) and the first light outgoing vector q12 ($\phi,\theta$), there can be expressed a first light outgoing point normal vector no1 ($\phi,\theta$) which is the unit normal vector of a virtual light outgoing surface at the first light outgoing point Po1.

Next, using the refractive index of material for forming the projection lens 14, a second light incident vector q20 ($\phi,\theta$) going from the second light emitting point S2 toward the light incident point Pi and the light incident point normal vector ni ($\phi,\theta$), there can be expressed a second transmission vector q21 ($\phi,\theta$) which is the advancing direction of the light from the light incident point Pi.

At this time, assuming again that the leading end of the second transmission vector q21 exists on the virtual light outgoing surface SF2, the leading end of the second transmission vector q21 is regarded as a second light outgoing point Po2 from which the light of the projection lens 14 goes out.

Here, since the distance between the first and second light emitting points S1 and S2 is minute as well as the distance between the first and second light outgoing points Po1 and Po2 is also minute, a second light outgoing point normal vector no2, which is the unit vector of the virtual light outgoing surface SF2 at the second light outgoing point Po2, is considered to be parallel to the first light outgoing point normal vector no1 of the first light outgoing point Po1 which uses the light incident point P1 serving as the light incident source in common with the second light outgoing point Po2, that is, the second light outgoing point normal vector no2 is considered the same as the first light outgoing point normal vector no1.

Therefore, using the second transmission vector q21 ($\phi,\theta$), the refractive index of material for forming the projecting lens 14 and first light outgoing point normal vector no1 ($\phi,\theta$), there can be expressed a second light outgoing vector q22 ($\phi,\theta$). Since the light to be emitted from the second light outgoing point Po2 goes toward the second projection point r2, a unit vector going from the second light going point Po2 toward the second projection point r2 provides the second light outgoing vector q22 ($\phi,\theta$).

Figure 8A:
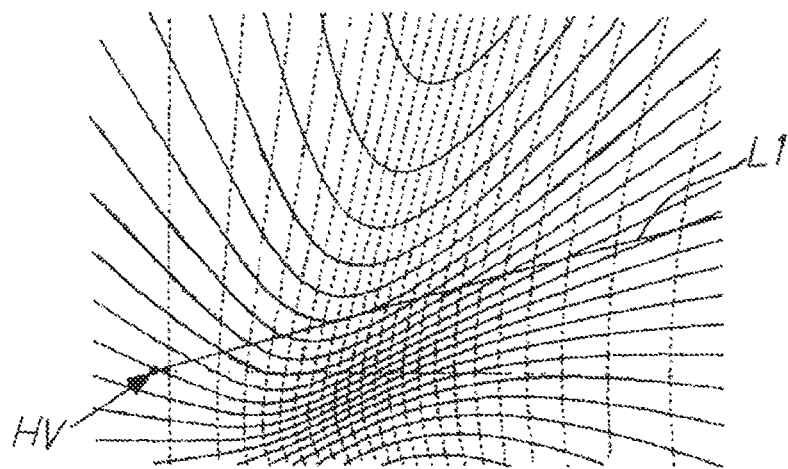
FIG. 8A is a view of the distributions of equal lines and equal θ lines by showing the loci of points at which a light emitted from the second light emitting point S2 reaches a screen when φ or θ of a light incident point normal vector ni (φ,θ) at a certain light incident point Pi is changed.
Figure 8B:
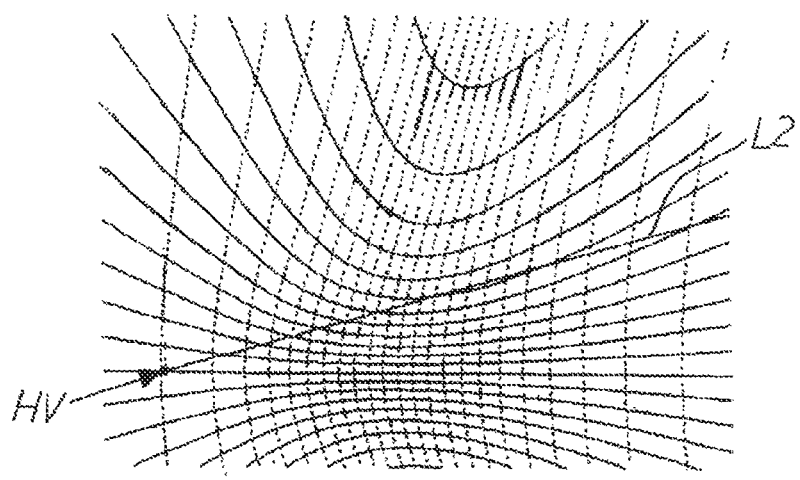
FIG. 8B is a view of the distributions of equal φ lines and equal θ lines by showing the loci of points at which a light emitted from the second light emitting point S2 reaches the screen when φ or θ of the incident point normal vector ni (φ,θ) at another light incident point Pi is changed.

FIG. 8A is a view of the distributions of equal $\phi$ lines and equal $\theta$ lines by showing the loci of points at which a light emitted from the second light emitting point S2 reaches a screen when $\phi$ or $\theta$ of a light incident point normal vector ni ($\phi,\theta$) at a certain light incident point Pi is changed. FIG. 8B is a view of the distributions of equal $\phi$ lines and equal $\theta$ lines by showing the loci of points at which a light emitted from the second light emitting point S2 reaches the screen when $\phi$ or $\theta$ of the incident point normal vector ni ($\phi,\theta$) at another light incident point Pi is changed. Specifically, FIG. 8A shows the distributions of the equal $\phi$ lines and equal $\theta$ lines at light incident points Pi (0, 10, 10). In both views, solid lines represent equal $\theta$ lines and broken lines represent equal $\theta$ lines, respectively. Also, FIG. 8B shows the distributions of the equal $\phi$ lines and equal $\theta$ lines at light incident points Pi (0, 10, 10). The coordinates of this light incident point Pi are the coordinates the origin of which is the first light emitting point S1, while the unit of the coordinates is mm.

These equal $\phi$ lines and equal $\theta$ lines are shown on the base of the relationship between the light incident point normal vector ni ($\phi,\theta$) and second light outgoing vector q22 ($\phi,\theta$) which have been described before with reference to FIG. 7. For example, by plotting the crossing points of the second light outgoing vector q22 and screen when $\phi$ of the light incident point normal vector ni ($\phi,\theta$) is set constant and $\theta$ is varied, there can be shown an equal $\phi$ line at the then value of $\phi$. With respect to such various values of $\phi$, there can be shown on the screen equal $\phi$ lines at the then values of $\phi$ when $\theta$ is varied. Similarly, with respect to such various values of $\theta$, there can be shown on the screen equal $\theta$ lines at the then values of $\phi$ when $\phi$ is varied.

In FIGS. 8A and 8B, lines L1 and L2 are respectively lines which extend from HV in the extending direction of the second cutoff line CL2. Here, in FIGS. 8A and 8B, the screen is assumed to exist backwardly of the lighting apparatus. Thus, the inclining directions of the lines L1 and L2 are opposite to the inclining direction of the second cutoff line CL2 shown in FIGS. 3 and 5.

A position, where the second light outgoing vector q22 ($\phi,\theta$) crosses a screen existing distantly therefrom, varies variously depending on the coordinates of the light incident point Pi and the value of the light incident point normal vector ni ($\phi,\theta$). Therefore, for example, for Pi (0, 10, 10), any one of coordinates ($\phi,\theta$) on the line L1 can be determined as the light incident point normal vector ni ($\phi,\theta$); and, for Pi (0, 10, 0), any one of coordinates ($\phi,\theta$) on the line L2 can be determined as the light incident point normal vector ni ($\phi,\theta$). Thus, the light emitted from the second light emitting point S2 passes through a surface (surface element) having a unit area, which has the determined light incident point normal vector ni ($\phi,\theta$) at the light incident point Pi of the virtual light incident surface SF1; and, the light further emitted from the second light outgoing point Po2 is projected at the second projection point r2 on the second cutoff line CL2.

Here, on the lines L1 and L2, there exist multiple coordinates ($\phi,\theta$). In order to determine any coordinates, there are known several methods. For example, in a method, assuming that $\theta$ is a given value, the value of $\phi$ is obtained or, assuming that $\phi$ is a given value, there is obtained the solution to $\theta$; and, when there exist multiple solutions to $\theta$, the solution of the minimum (or maximum) value is selected to thereby determine $\theta$. According to another method, the value of $\theta$ or $\phi$ is varied according to the coordinates of the light incident point Pi to thereby determine $\theta$ and $\phi$ which can satisfy a given condition. Using any of the above methods, there are determined coordinates ($\phi,\theta$) which can be employed as the light incident point normal vectors ni ($\phi,\theta$).

Figure 9:
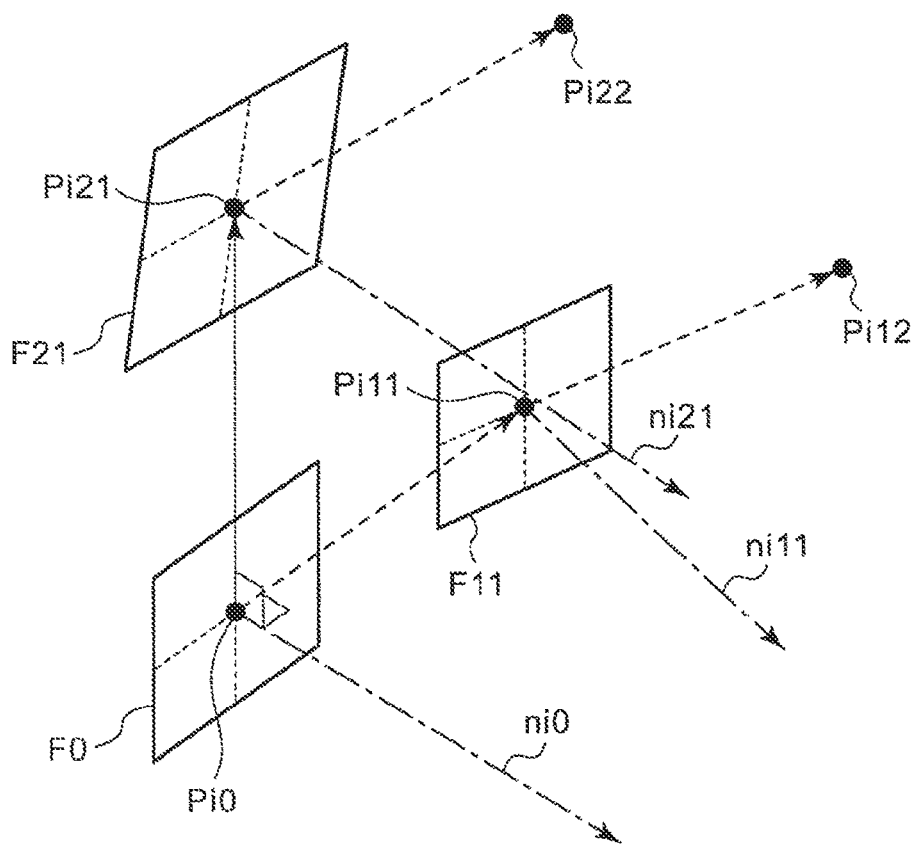
FIG. 9 is an explanatory view of a method for defining multiple light incident points Pi.

FIG. 9 is an explanatory view of a method for defining multiple light incident points Pi. Description has been given heretofore of the method for calculating the light incident point normal vector ni ($\phi,\theta$) for a single light incident point Pi. Now, this method is applied similarly to the multiple light incident points Pi to thereby calculate light incident point normal vectors ni ($\phi,\theta$) at the respective light incident points Pi. Here, in order to define the smooth shape of a virtual light incident surface SF1, according to the following method, there is determined a next light incident point Pi which is used to calculate the light incident point normal vector ni ($\phi,\theta$).

Firstly, in order to calculate the light incident point normal vectors ni, the position of a certain first light incident point Pi is defined and, according to the above method, there is calculated the light incident point normal vector ni ($\phi,\theta$) at the light incident point Pi. Next, on a plane including the light incident point Pi and having the light incident point normal vector ni calculated at such light incident point Pi, there is defined the position of a next light incident point Pi which is used to calculate the light incident point normal vector ni ($\phi,\theta$). By repeating this step, there are defined the respective positions of the multiple light incident points Pi.

In an example shown in FIG. 9, for a light incident point Pi0, there is firstly calculated a light incident point normal vector ni0 ($\phi,\theta$). Next, there is defined a light incident point Pi11 on a plane F0 which includes the light incident point Pi0 and has the light incident point normal vector ni0 ($\phi,\theta$); and, for this light incident point Pi11, there is calculated a light incident point normal vector ni11 ($\phi,\theta$). In this case, the distance between the light incident points Pi0 and Pi11 can be set arbitrarily. The larger the distance is, the simpler the calculation while the accuracy is lower; but, inversely, the smaller the distance is, the accuracy is higher while the load of the calculation is greater. Further, there is defined a light incident point Pi12 on a plane F11 which includes the light incident point Pi11 and has the light incident point normal vector ni11 ($\phi,\theta$).

However, this can define the light incident points Pi only on a line. In view of this, on the plane F0, there is defined a light incident point Pi21 besides the light incident point Pi11 and, for the light incident point Pi21, there is calculated a light incident point normal vector ni21 ($\phi,\theta$). Further, there is defined a light incident point Pi22 on a plane F21 which includes the light incident point Pi21 and has the light incident point normal vector ni21 ($\phi,\theta$). By repeating this step, on the virtual light outgoing surface SF2, there can be defined the positions of the multiple light incident points Pi which exist in a wide range.

Figure 10A:
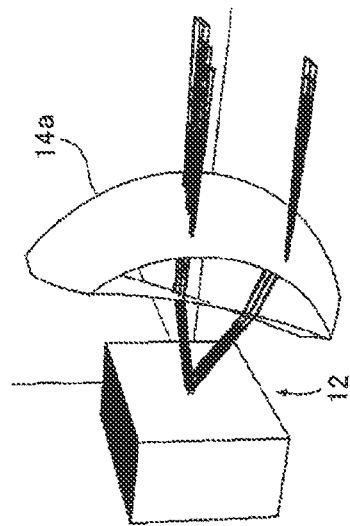
FIG. 10A is a top plan view an example of a projection lens having the defined shape of a virtual light incident surface SF1.
Figure 10C:
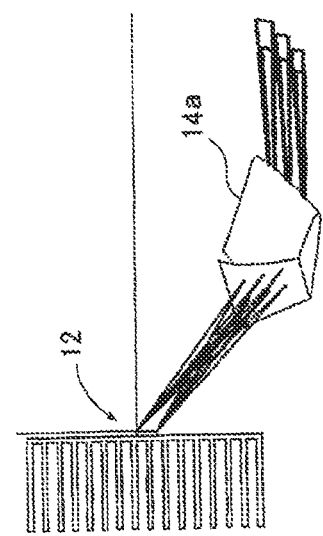
FIG. 10C is a perspective view of the example of the projection lens.
Figure 10B:
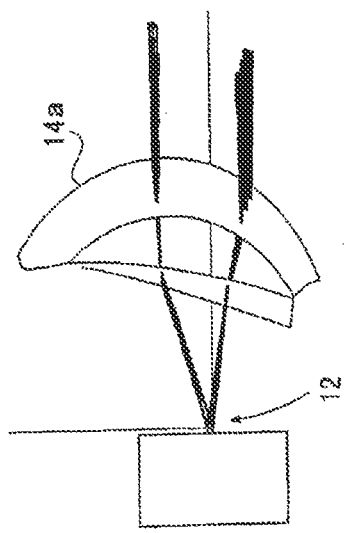
FIG. 10B is a right side view of the example of the projection lens.

FIGS. 10A, 10B and 10C are respectively the top plan view, right side view and perspective view of an example of the projection lens 14 formed to have the defined shape of the virtual light incident surface SF1. In this manner, using the above method, the shape of the projection lens 14 can be determined.

Here, in order to determine the shape of the virtual light incident surface SF1, a curve fitting method may also be carried out using the positions of the calculated multiple light incident points Pi and the light incident point normal vectors ni ($\phi,\theta$) calculated at the respective light incident points Pi. Such curve fitting method is known well and thus the description thereof is omitted here. Also, in the case that the shape of the light incident surface 14c has been determined, the shape of a light outgoing surface 14d where the light emitted from the first light emitting point S1 can be projected at the first projection point r1 can be determined according to the shape of the light incident surface 14c. This method for determining the shape of the light outgoing surface 14d according to the shape of the light incident surface 14c in this manner is known well and thus the description thereof is omitted here.

Figure 11:
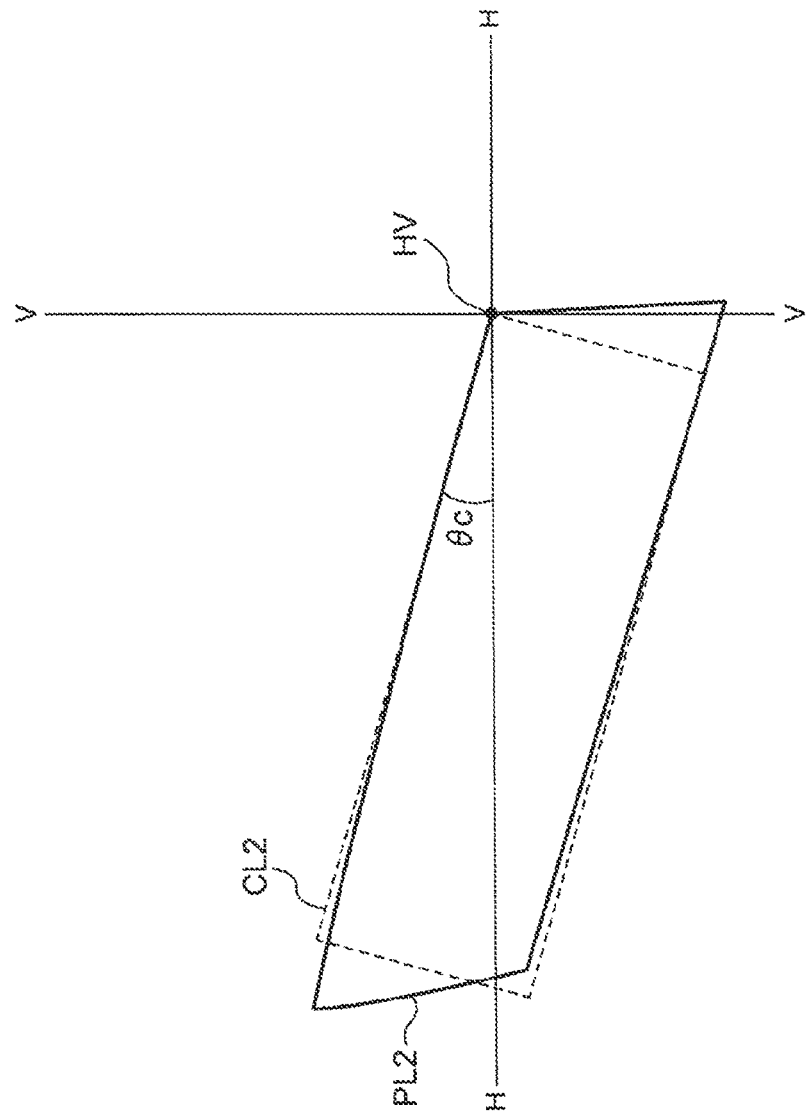
FIG. 11 is a view of an HZ light distribution pattern PL2 actually formed using a projection lens according to the exemplary embodiment.

FIG. 11 shows the shape of an HZ light distribution pattern PL2 which is actually formed using the projection lens 14 according to the exemplary embodiment. In FIG. 11, a broken line shows the shape of the HZ light distribution pattern PL2 to be formed, while a solid line shows an HZ light distribution pattern PL2 formed when the light emitting surface 20a is projected by the projection lens 14 including the light incident surface 14c having the shape defined according to the above method. In the case of the actual HZ light distribution pattern PL2, the corner portion thereof is not right angles but the second cutoff line CL2 is formed substantially as expected.

Also, as described above, by defining the first light emitting point S1 in the lower right corner portion of the light emitting surface 20a corresponding to HV on the screen, a strong light condensing portion can be set near HV. Therefore, there can be provided the vehicle light apparatus 10 which is capable of forming a proper low beam light distribution pattern PL. Also, by defining the first light emitting point S1 in the lower end portion of the light emitting surface 20a distant from the lower right corner portion thereof, there can be provided the vehicle lighting apparatus 10 which includes a strong light condensing portion in such portion of the second cutoff line CL2 as corresponds to the first light emitting point S1 and is capable of forming a second cutoff line CL2 movable to the dark portion the more slowly the more it approaches the right and left end portions.

According to the above exemplary embodiment, a method for manufacturing a lens may include: a step in which a first light emitting point S1, a second light emitting point S2 and a first projection point r1 are respectively defined and, in order that lights emitted from the first light emitting point S1 and incident on multiple light incident points Pi respectively existing on a virtual light incident surface and are projected onto the first projection point r1 and also that lights emitted from the second light emitting point S2 and incident on the respective light incident points Pi are projected onto a second projection point r2 spaced in a predetermined direction from the first projection point r1, a normal directions ni of the virtual light incident surface SF1 at the multiple light incident points Pi are respectively calculated; a step in which a shape of the virtual light incident surface SF1 is defined using the normal directions ni calculated at the multiple light incident points Pi; and a step in which a light incident surface of the lens is formed in such a manner that it has the thus defined shape of the virtual light incident surface.

According to the method, the shape of the light incident surface of the lens can be determined first. Therefore, in the lens design, for example, with a space or a design taken into consideration, the shape of the light outgoing surface of the lens can be decided thereafter. That is, a high degree of freedom of design can be realized.

The normal directions ni of the virtual light incident surface at the multiple light incident points Pi may also be calculated under the following assumption. That is, at respective first light outgoing points Po1 on the virtual light outgoing surface SF2 from which the lights emitted from the first light emitting point S1 and incident on the respective light incident points Pi are emitted, normal directions no1 of the virtual light outgoing surface are calculated in such a manner that the thus emitted lights are projected onto the first projection point r1; and normal directions no2 of the virtual light outgoing surface SF2 at respective second light outgoing points Po2 on the virtual light outgoing surface SF2 from which the lights emitted from the second light emitting point S2 and incident on the respective light incident point Pi are emitted are parallel to the normal directions no1 of the virtual light outgoing surface which have the light incident points P1 serving as the light incident sources in common with the respective second light outgoing points Po2.

Originally, there is a possibility that, even when the light incident points Pi serving as the light incident sources are used in common, at two light outgoing points from which lights respectively emitted from two different light emitting points are allowed to go out after they have passed through the lens, the normal directions of the surface of the lens can be different from each other. However, as in the exemplary embodiment, by considering that the normal directions of the lens surface at two light outgoing points are the same, the shape of the light incident surface can be decided first without deciding the shape of the light outgoing surface.

The positions of multiple light incident points Pi may also be defined by repeating the following step. That is, the position of a certain light incident point Pi used to calculate a normal direction ni is defined, and the position of a next light incident point Pi used to calculate a normal direction ni is defined on a plane which includes such light incident point Pi and has the normal direction ni calculated for such light incident point Pi. According to this measure, the positions of multiple light incident points Pi can be defined easily. Therefore, the shape of the light incident surface can also be decided easily.

Further, the first and second light emitting points S1 and S2 may also be defined such that they exist on the same end edge of the light emitting surface of a light source; the first projection point r1 may also be defined such that it exists on the cutoff line of a projection image to be formed; and, the normal directions ni of a virtual light incident surface at the respective light incident points Pi may also be calculated in such a manner that the light emitted from the second light emitting point S2 can be incident on the respective light incident points Pi and can be then projected onto a second projection point r2 spaced in the extending direction of the cutoff line from the first projection point r1. According to this measure, there can be easily manufactured a lens which is capable of forming a cutoff line as the projection image of the end edge of the light emitting surface.

In addition, according to the exemplary embodiment, there is provided a lens including a light incident surface having the shape that can be determined in the following manner. That is, a first light emitting point S1, a second light emitting point S2 and a first projection point r1 are defined respectively; in order that the light emitted from the first light emitting point S1 can be incident on multiple light incident points Pi respectively existing on a virtual light incident surface and can be then projected onto the first projection point r1, and also that the light emitted from the second light emitting point S2 can be incident on the respective light incident points Pi and can be then projected onto the second projection point r2 spaced in a predetermined direction from the first projection point r1, the normal directions ni of the virtual light incident surface at the multiple light incident points Pi are calculated; and, the shape of the virtual light incident surface is defined using the normal directions ni respectively calculated at the multiple light incident points Pi. Thus, the light incident surface of the lens has the shape of the thus defined shape of the virtual light incident surface.

According to the exemplary embodiment, since the shape of the light incident surface of the lens can be decided first, the lens can be designed with a high degree of freedom of design.

According to the exemplary embodiment, there can be provided a lens which can make effective use of the shape of the light emitting portion of the light source in forming a light distribution pattern and also which has a high degree of freedom of design.

While description has been made in connection with the specific exemplary embodiment and options thereof, it will be obvious to those skilled in the art that various changes and modifications may be made therein without departing from the present invention. It is aimed, therefore, to cover in the appended claims all such changes and modifications falling within the true spirit and scope of the present invention.

For example, according to one modification, there is omitted the reflector unit 16 and, instead of this, there is provided a lens which is used to form a wide zone light distribution pattern PL1. This lens may also be formed integrally with a lens for forming the HZ light distribution pattern PL2, or may also be formed separately. According to this modification, the low beam light distribution pattern PL can be formed using only the light source unit 12 and the lens.

DESCRIPTION OF REFERENCE NUMERALS AND SIGNS

10: Vehicle lighting apparatus
12: Light source unit
14: Projection lens
14c: Light incident surface
14d: Light outgoing surface
16: Reflector unit
20: Semiconductor light emitting element
22: Substrate

What is claimed is:
1. A method for manufacturing a lens of a vehicular lighting apparatus, the method comprising:
defining a first light emitting point (S1) and a second light emitting point (S2) provided on a light emitting surface of a light source;
defining a virtual light incident surface corresponding to a first assumed surface generated by computerized model to be located at a position where a light incident surface of the lens exists;
defining a virtual light outgoing surface corresponding to a second assumed surface generated by computerized model to be located at a position where a light outgoing surface of the lens exists;
defining a first projection point (r1) and a second projection point (r2) provided on a projection image on a virtual screen generated by the vehicular lighting apparatus, the first projection point (r1) corresponding to a calculated point based on a position where light emitted from the first light emitting point (S1) and through the virtual light incident surface intersects the virtual screen and the second projection point (r2) corresponding to a calculated point based on a position where light emitted from the second light emitting point (S2) and through the virtual light incident surface intersects the virtual screen;
respectively calculating normal directions (ni) of the virtual light incident surface at a plurality of light incident points (Pi) provided on the virtual light incident surface, the plurality of light incident points (Pi) corresponding to calculated points where the lights emitted from the first and second light emitting points (S1, S2) intersect the virtual light incident surface, in order that the lights emitted from the first light emitting point (S1) and incident on said respective light incident points (Pi) are projected onto said first projection point (r1) and that the lights emitted from the second light emitting point (S2) and incident on said virtual light incident points (Pi) are projected onto the second projection point (r2) provided on the projection image and spaced apart in a predetermined direction from the first projection point (r1);
defining a shape of the virtual light incident surface based on the normal directions (ni) calculated for the respective light incident points (Pi); and
forming the light incident surface of the lens to have the defined shape of the virtual light incident surface, the forming comprising manufacturing the lens of the vehicular lighting apparatus having the defined shape of the virtual light incident surface wherein:
first normal directions (no1) of the virtual light outgoing surface are calculated in order that the emitted lights from a plurality of first light outgoing points (Po1) are projected onto the first projection point (r1), the first normal directions (no1) correspondingly calculated at the plurality of first light outgoings (Po1) on the virtual light outgoing surface from which the lights emitted from the first light emitting point (S1) and incident on the respective light incident points (Pi) are emitted, and
the normal directions (ni) of the virtual light incident surface at the light incident points (Pi) are calculated based on second normal directions (no2) of the virtual light outgoing surface at second light outgoing points (Po2) on the virtual light outgoing surface being respectively parallel to the first normal directions (no1) of the virtual light outgoing surface at corresponding first light outgoing points (Po1) of the virtual light outgoing surface having the same light incident points of the plurality of light incident points (Pi) as the second light outgoing points (Po2) have,
the lights emitted from the second light emitting point (S2) are incident on the light incident points (Pi) and are then emitted to the second light outgoing points (Po2), and
wherein:
the first light emitting point (S1) and the second light emitting point (S2) are provided on the same edge of a plurality of edges of the light emitting surface of the light source; and
the first projection point (r1) and the second projection point (r2) are provided on a hot zone light distribution pattern and provided along a cutoff line which is inclined upwardly from a horizontal direction.

2. The method according to claim 1, further comprising:
defining positions of the plurality of light incident points (Pi) by repeating steps each including defining a position of a certain light incident point (Pi0) of the plurality of light incident points (Pi) for which a corresponding normal direction (ni) is to be calculated, and defining a position of a next light incident point (Pi11, Pi 21) of the plurality of light incident points (Pi) for which a corresponding normal direction (ni11, ni21) is to be calculated on a plane including said certain light incident point (Pi0) and having the normal direction (ni0) of said certain light incident point (Pi0).

3. The method according to claim 1, further comprising:
defining the first emitting point (S1) and the second light emitting point (S2) on a single end edge of the light emitting surface of the light source;
defining the first projection point (r1) on a cutoff line of the projection image; and
calculating the normal directions (ni) of the virtual light incident surface at the respective light incident points (Pi) in order that the lights emitted from the second light emitting point (S2) and incident on the respective light incident points (Pi) are projected onto the second projection point (r2) spaced in an extending direction of the cutoff line from the first projection point (r1).

4. The method according to claim 2, further comprising:
defining the first emitting point (S1) and the second light emitting point (S2) on a single end edge of the light emitting surface of the light source;
defining the first projection point (r1) on a cutoff line of the projection image; and
calculating the normal directions (ni) of the virtual light incident surface at the respective light incident points (Pi) in order that the lights emitted from the second light emitting point (S2) and incident on the respective light incident points (Pi) are projected onto the second projection point (r2) spaced in an extending direction of the cutoff line from the first projection point (r1).

5. The method according to claim 1, wherein the light emitting surface of the light source has a predetermined shape and the lights emitted from the lens has a shape corresponding to the predetermined shape of the light emitting surface of the light source.

* * * * *